US008664499B2

(12) United States Patent
Hyun

(10) Patent No.: US 8,664,499 B2
(45) Date of Patent: Mar. 4, 2014

(54) NOSE PIPE INSTRUMENT CAPABLE OF MODULATING THE TONE THEREOF

(76) Inventor: Jang Kwang Hyun, Gwangju (KR)

( * ) Notice: Subject to any disclaimer, the term of this patent is extended or adjusted under 35 U.S.C. 154(b) by 226 days.

(21) Appl. No.: 13/382,153

(22) PCT Filed: Jul. 6, 2010

(86) PCT No.: PCT/KR2010/004383
§ 371 (c)(1), (2), (4) Date: Jan. 3, 2012

(87) PCT Pub. No.: WO2011/007978
PCT Pub. Date: Jan. 20, 2011

(65) Prior Publication Data
US 2012/0097008 A1 Apr. 26, 2012

(30) Foreign Application Priority Data
Jul. 15, 2009 (KR) ........................ 10-2009-0064422

(51) Int. Cl.
*G01D 7/00* (2006.01)

(52) U.S. Cl.
USPC ........................................................ 84/330

(58) Field of Classification Search
USPC ........................................................ 84/330
See application file for complete search history.

(56) References Cited

U.S. PATENT DOCUMENTS

| | | | | |
|---|---|---|---|---|
| 2,197,993 A | * | 4/1940 | Berry | 84/330 |
| 2,245,432 A | * | 6/1941 | Davis | 84/330 |
| D368,485 S | * | 4/1996 | Paulus | D17/10 |

FOREIGN PATENT DOCUMENTS

| | | |
|---|---|---|
| JP | 56-087090 | 7/1981 |
| JP | 56-110488 | 8/1981 |
| JP | 59-118583 | 8/1984 |
| KR | 20-1997-0060803 | 12/1997 |

OTHER PUBLICATIONS

International Search Report for PCT/KR2010/004383 mailed Feb. 23, 2011.

* cited by examiner

*Primary Examiner* — Jianchun Qin
(74) *Attorney, Agent, or Firm* — AKC Patents; Aliki K. Collins

(57) ABSTRACT

Disclosed is a nose pipe instrument capable of modulating the tone thereof. The nose pipe instrument capable of modulating the tone thereof enables a modulating plate to slide to adjust the length of a sealing path for the passage of breath from the nose of a player. Thus, the nose pipe instrument of the present invention can modulate the pitch of the tone to be played, thereby enabling various notes to be played.

7 Claims, 3 Drawing Sheets

NOSE PIPE INSTRUMENT CAPABLE OF MODULATING THE TONE THEREOF

RELATED APPLICATIONS

This application is a 371 application of International Application No. PCT/KR2010/004383, filed Jul. 6, 2010, which in turn claims priority from Korean Patent Application No. 10-2009-0064422, filed Jul. 15, 2009, each of which is incorporated herein by reference in its entirety.

TECHNICAL FIELD

The present invention relates to a nose pipe instrument which is capable of modulating the tone thereof.

BACKGROUND ART

A nose pipe instrument is a simple musical instrument which plays the scale by using the strength of the breath from the nose of a player and change in mouth shape of the player.

A conventional nose pipe instrument which is disclosed as Korean Public Utility Model No. 1997-60803 will be described with reference to FIG. 1. FIG. 1 is a perspective view of the conventional nose pipe instrument.

As shown therein, the conventional nose pipe instrument includes a nose adherence part 1, a philtrum part 2 and a mouth adherence part 3. A hollow part 2*a* is formed in the philtrum part 2, and an opening 3*a* is formed in the mouth adherence part 3.

If a user blows his/her breath from the nose while closely adhering the nose adherence part 1, the philtrum 2 and the mouth adherence part 3 to his/her face, the nose breath is discharged to the outside through the hollow part 2*a* and the opening 3*a*. As the opening state of the opening 3*a* is changed by the strength of the nose breath and the change of mouth shape, notes are played.

As the conventional nose pipe instrument has the nose adherence part 1, philtrum 2 and mouth adherence part 3 formed as an integral part, the length of the hollow part 2*a* through which the nose breath passes is not adjusted. Thus, a pitch of the tone is not adjusted to high, low or intermediate tone.

DISCLOSURE

Technical Problem

The present invention has been made to solve the problems and it is an object of the present invention to provide a nose pipe instrument which plays music by adjusting the tone thereof.

Technical Solution

In order to achieve the object of the present invention, a nose pipe instrument comprises a body which comprises a nose adherence part that is provided in an upper side of a rear surface of the body and protrudes toward a rear side and is closely adhered by a nose of a player, a mouth adherence part that is provided in a lower side of the rear surface of the body and is closely adhered by a mouth of a player and a philtrum adherence part that is provided in a central part of the rear surface of the body and is closely adhered by a philtrum of a player, an inlet hole that is formed in the nose adherence part to introduce and discharge the breath of the nose of a player and a discharging hole that is formed in the mouth adherence part and a depression path that is depressed and connects the inlet hole and the discharging hole; and a modulating plate which is slidably coupled to the depression path and forms a sealing path between the modulating plate and the depression path to transmit the nose breath from the inlet hole to the discharging hole.

Advantageous Effect

As described above, a nose pipe instrument which is capable of modulating the tone thereof enables a modulating plate to slide to adjust the length of a sealing path for the passage of breath from the nose of a player. Thus, the nose pipe instrument of the present invention can modulate the pitch of the tone to be played, thereby enabling various notes to be played.

BEST MODE

Hereinafter, a nose pipe instrument which is capable of modulating the tone thereof according to an exemplary embodiment of the present invention will be described in detail with reference to accompanying drawings.

Figure 1:
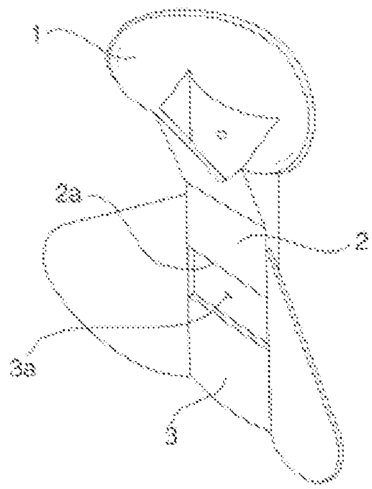
FIG. 1 is a perspective view of a conventional nose pipe instrument.
Figure 2:
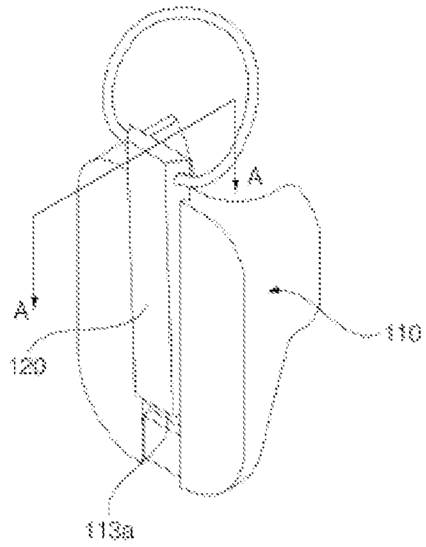
FIG. 2 is a perspective view of a nose pipe instrument according to an exemplary embodiment of the present invention.
Figure 3:
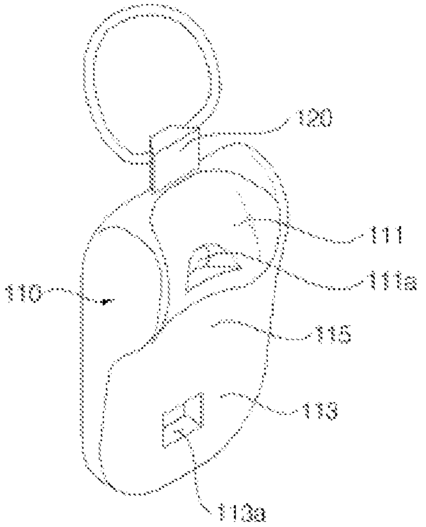
FIG. 3 is a rear perspective view of the nose pipe instrument in FIG. 2.
Figure 4:
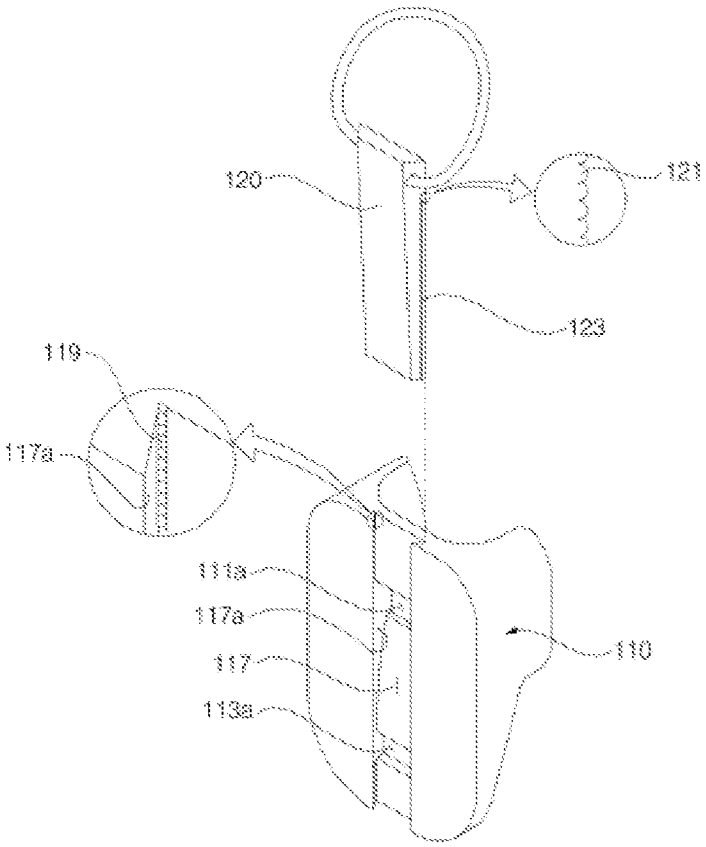
FIG. 4 is a partial exploded perspective view of the nose pipe instrument in FIG. 2.
Figure 5:
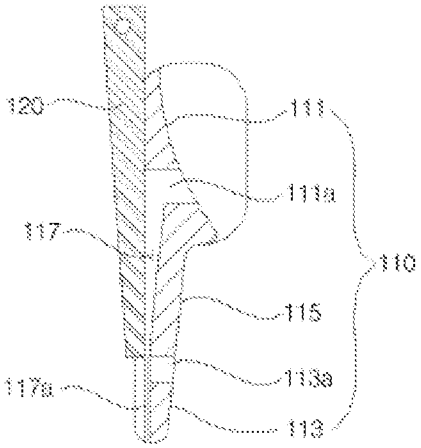
FIG. 5 is a sectional view of the line "A-A" in FIG. 2.
Figure 6:
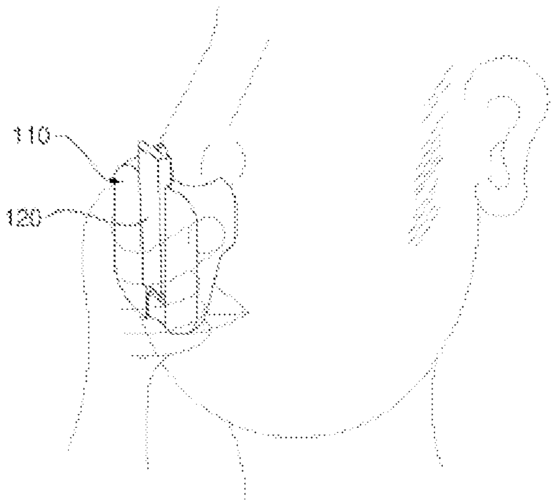
FIG. 6 is a perspective view of a usage state of the nose pipe instrument according to the exemplary embodiment of the present invention.

FIG. 2 is a perspective view of a nose pipe instrument according to an exemplary embodiment of the present invention. FIG. 3 is a rear perspective view of the nose pipe instrument in FIG. 2. FIG. 4 is a partial exploded perspective view of the nose pipe instrument in FIG. 2. FIG. 5 is a sectional view of the line "A-A" in FIG. 2. FIG. 6 is a perspective view of a usage state of the nose pipe instrument according to the exemplary embodiment of the present invention.

As shown therein, the nose pipe instrument according to the present exemplary embodiment includes a body 110 and a modulating plate 120.

A nose adherence part 111 to which a nose is closely adhered protrudes from an upper side of a rear surface of the body 110 toward a rear side, and a mouth adherence part 113 to which a mouth is closely adhered is formed in a lower side of the rear surface. A philtrum adherence part 115 to which a philtrum is closely adhered to is formed in a central part of the rear surface.

An inlet hole 111*a* through which the nose breath is introduced and discharged is formed in the nose adherence part 111, and a discharging hole 113*a* is formed in the mouth adherence part 113. A depression path 117 which connects the inlet hole 111*a* and the discharging hole 113*a* is formed in a front surface of the body 110. The depression path 117 is formed from an upper end to a lower end of the front surface of the body 110 and connects the inlet hole 111*a* and the discharging hole 113*a*.

The modulating plate 120 is slidably coupled to the depression path 117. The modulating plate 120 forms a sealing path between the modulating plate 120 and the depression path 117 to transmit the nose breath from the inlet hole 111*a* to the discharging hole 113*a*. The modulating plate 120 is slidably installed and adjusts the length of the sealing path. If a lower end surface of the modulating plate 120 is closer to an upper surface of the discharging hole 113*a*, a lower tone is played. If the lower end surface of the modulating plate 120 is farther from the upper surface of the discharging hole 113*a*, a higher tone is played. The distance between the lower end surface of the modulating plate 120 and the upper surface of the discharging hole 113*a* is properly adjusted.

An upper side of the rear surface of the modulating plate 120 is closely adhered to the front surface of the body 110 in an upper side of the inlet hole 111*a* forming the depression path 117 and closes the depression path 117 in the upper side of the inlet hole 111*a*. The lower side of the rear surface of the modulating plate 120 is spaced from the front surface of the body 110 between the inlet hole 111*a* forming the depression path 117 and the discharging hole 113*a*.

To slidably couple the modulating plate 120 to the depression path 117, opposite surfaces 117*a* of the body 110 forming the depression path 117 are inclined to be closer toward the front side of the body 110. Opposite surfaces of the modulating plate 120 are inclined to be closer toward the front side of the body 110 corresponding to the opposite surfaces 117*a* of the body 110 forming the depression path 117. As the inclined opposite surfaces of the modulating plate 120 are inserted into and coupled to the opposite surfaces 117*a* of the body 110 forming the inclined depression path 117, the modulating plate 120 which is inserted into and coupled to the depression path 117 is not separated toward the front side of the body 110.

A plurality of holding grooves 119 and a plurality of projections 121 which are coupled to each other are formed in the opposite surfaces 117*a* of the body 110 and the opposite surfaces of the modulating plate 120 forming the depression path 117 so that the modulating plate 120 which slides along the depression path 117 maintains its suspension state in a predetermined location. The holding grooves 119 may be formed in the opposite surfaces 117*a* of the body 110 forming the depression path 117 in the upper side of the inlet hole 111*a*, and the projections 121 may be formed in the opposite surfaces in the upper side of the modulating plate 120.

To prevent the nose breath which is introduced through the sealing path from being leaked to the outside through the opposite surfaces of the modulating plate 120, a packing 123 which contacts the opposite surfaces 117*a* of the body 110 forming the depression path 117 is inserted into and installed in the opposite surfaces of the modulating plate 120 in a lengthwise direction of the depression path 117. The packing 123 contacts the opposite surfaces 117*a* of the body 110 forming the depression path 117.

The packing 123 may be inserted into and installed in the opposite surfaces 117*a* of the body 110 forming the depression path 117.

The depression path 117 which is provided between the inlet hole 111*a* and the discharging hole 113*a* is inclined to protrude further to the front side of the body 110 from the inlet hole 111*a* to the discharging hole 113*a*. This is intended to form a wide sealing path in the side of the inlet hole 111*a* and introduce the nose breath from the inlet hole 111*a* to the sealing path.

In the nose pipe instrument according to the present exemplary embodiment, if a player blows the nose breath while he/she closely adheres the nose adherence part 111, mouth adherence part 113 and philtrum part 115 to his/her nose, mouth and philtrum, respectively, the nose breath is introduced from the inlet hole 111*a* to the sealing path and then a part thereof is discharged through the discharging hole 113*a* and the other is introduced to the mouth. If a player changes the strength of the nose breath and the mouth shape, a desired tone is played. If a location of the modulating plate 120 is properly adjusted, a tone with a desired pitch may be played.

Although a few exemplary embodiments have been shown and described, it will be appreciated by those skilled in the art that changes may be made in these exemplary embodiments without departing from the principles and spirit of the invention, the range of which is defined in the appended claims and their equivalents.

The invention claimed is:

1. A nose pipe instrument comprising:

a body which comprises a nose adherence part that is provided in an upper side of a rear surface of the body and protrudes toward a rear side and is closely adhered by a nose of a player, a mouth adherence part that is provided in a lower side of the rear surface of the body and is closely adhered by a mouth of a player and a philtrum adherence part that is provided in a central part of the rear surface of the body and is closely adhered by a philtrum of a player, an inlet hole that is formed in the nose adherence part to introduce and discharge the breath of the nose of a player and a discharging hole that is formed in the mouth adherence part and a depression path that is depressed and connects the inlet hole and the discharging hole; and a modulating plate which is slidably coupled to the depression path and forms a sealing path between the modulating plate and the depression path to transmit the nose breath from the inlet hole to the discharging hole.

2. The nose pipe instrument according to claim 1, wherein the depression path is formed from an upper end to a lower end of the front surface of the body, and the modulating plate is closely adhered to the front surface of the body in the upper side of the inlet hole forming the depression path to close the depression path in the upper side of the inlet hole, and is spaced from the front surface of the body between the inlet hole forming the depression path and the discharging hole to form the sealing path.

3. The nose pipe instrument according to claim 2, wherein opposite surfaces of the body forming the depression path are inclined to be closer toward the front side of the body, and opposite surfaces of the modulating plate are inclined corresponding to the opposite surfaces of the body forming the depression path to be inserted into and coupled to the opposite surfaces of the body forming the depression path.

4. The nose pipe instrument according to claim 3, wherein a packing is inserted into and installed in one of the opposite surfaces of the body forming the depression path and the opposite surfaces of the modulating plate to prevent the nose breath from being leaked through the opposite surfaces of the modulating plate.

5. The nose pipe instrument according to claim 3, wherein a plurality of holding grooves and a plurality of projections which are coupled to each other are formed in the opposite surfaces of the body forming the depression path and the opposite surfaces of the modulating plate, respectively.

6. The nose pipe instrument according to claim 5, wherein the holding grooves are formed in the opposite surfaces of the body forming the depression path in the upper side of the inlet hole, and the projections are formed in the opposite surfaces of the upper side of the modulating plate.

7. The nose pipe instrument according to claim 1, wherein the depression path which is provided between the inlet hole and the discharging hole protrudes further toward the front side of the body from the inlet hole to the discharging hole.

* * * * *